US005621902A

United States Patent [19]

Cases et al.

[11] Patent Number: 5,621,902
[45] Date of Patent: Apr. 15, 1997

[54] COMPUTER SYSTEM HAVING A BRIDGE BETWEEN TWO BUSES WITH A DIRECT MEMORY ACCESS CONTROLLER AND AN ALTERNATIVE MEMORY ACCESS CONTROLLER

[75] Inventors: Moises Cases, Delray Beach, Fla.; Richard G. Hofmann, Cary, N.C.; Lance M. Venarchick, Boca Raton, Fla.

[73] Assignee: International Business Machines Corporation, Armonk, N.Y.

[21] Appl. No.: 351,195

[22] Filed: Nov. 30, 1994

[51] Int. Cl.⁶ ................................................ H01J 13/00
[52] U.S. Cl. .................... 395/309; 395/308; 395/306; 395/842; 395/847; 395/843; 395/848; 395/287
[58] Field of Search ........................... 395/842, 843, 395/847, 306, 308, 309, 848, 287

[56] References Cited

U.S. PATENT DOCUMENTS

| | | | |
|---|---|---|---|
| 4,317,565 | 3/1982 | Mager et al. | 395/842 |
| 5,359,715 | 10/1994 | Heil et al. | 395/309 |
| 5,389,324 | 2/1995 | Matida et al. | 395/425 |
| 5,396,602 | 3/1995 | Armini et al. | 395/325 |
| 5,420,984 | 5/1995 | Good et al. | 395/847 |
| 5,450,551 | 9/1995 | Amini et al. | 395/299 |
| 5,471,590 | 11/1995 | Melo et al. | 395/288 |
| 5,548,786 | 8/1996 | Amini et al. | 395/847 |

*Primary Examiner*—Jack B. Harvey
*Assistant Examiner*—Raymond N. Phan
*Attorney, Agent, or Firm*—Anthony N. Magistrale

[57] ABSTRACT

A computer system having a peripheral controller interconnect (PCI) bus and an industry standard architecture (ISA), with ISA compatible devices coupled to the ISA bus, is provided with a first bridge coupled between the PCI and ISA buses. The first bridge has a first direct memory access (DMA) control circuit for controlling DMA transfers with the ISA devices. In order to achieve expanded compatibility with other types of devices, the system is also provided with an expansion bus, such as a Microchannel bus, with Microchannel compatible devices coupled to the Microchannel bus. A second bridge is coupled between the PCI and the Microchannel buses. This second bridge has a second DMA control circuit that controls DMA transfers with the ISA devices and with the Microchannel devices. Software disables the first DMA control circuit such that only the second DMA control circuit controls DMA transfers within the computer system.

3 Claims, 3 Drawing Sheets

COMPUTER SYSTEM HAVING A BRIDGE BETWEEN TWO BUSES WITH A DIRECT MEMORY ACCESS CONTROLLER AND AN ALTERNATIVE MEMORY ACCESS CONTROLLER

BACKGROUND OF THE INVENTION

1. Field of the Invention

The present invention relates to the field of digital computer systems, and more particularly, to the direct memory access control of devices located on a bus.

2. Description of Related Art

In computer systems, electronic chips and other components are connected with one another by buses. A variety of components can be connected to the bus, providing intercommunication between all of the devices that are connected to the bus. One type of bus which has gained wide industry acceptance is the industry standard architecture (ISA) bus. The ISA bus has twenty-four (24) memory address lines which therefore provides support for up to sixteen (16) megabytes of memory. The wide acceptance of the ISA bus has resulted in a very large percentage of devices being designed for use on the ISA bus. However, high input devices commonly used in computer systems require faster buses. A solution to the general problem of sending and receiving data from the processor to any high input device is a local bus. Unlike the ISA bus, which operates relatively slowly with limited bandwidth, a local bus communicates at system speed and carries data in 32-bit blocks. Local bus machines remove from the main system bus those interfaces that need quick response, such as memory, display, and disk drives. One such local bus that is gaining acceptance in the industry is the peripheral component interconnect (PCI) bus. The PCI bus can be a 32 or 64-bit pathway for high-speed data transfer. Essentially, the PCI bus is a parallel data path provided in addition to an ISA bus. The system processor and memory can be attached directly to the PCI bus, for example. Other devices such as graphic display adapters, disk controllers, sound cards, etc. can also attach directly or indirectly (e.g., through a host bridge) to the PCI bus.

A bridge chip is provided between the PCI bus and the ISA bus in order to provide communication between devices on the two buses. The bridge chip essentially translates the ISA bus cycles to PCI bus cycles, and vice versa.

Many of the devices attached to the PCI bus and the ISA bus are master devices that can conduct processing independently of the bus or other devices. Certain devices coupled to the buses are considered to be slaves or targets that accept commands and respond to requests of a master. The PCI bus has an addressing capability of 32 bits to provide for 4 gigabytes of memory access. A master on the ISA bus can access a memory location in the memory on the PCI bus, although normally only within the lowest 16 megabyte region due to the 24-bit addressing of the ISA bus masters.

In a digital computer, a microprocessor operates on data stored in a main memory. Since there are practical size limitations on the main memory, bulk memory storage devices are provided in addition to and separately from the main memory. When the microprocessor wants to make use of data stored in bulk storage, for example, a hard disk, the data is moved from the hard disk into the main memory. This movement of blocks of memory inside the computer is a very time consuming process and would severely hamper the performance of the computer system if the microprocessor were to control the memory transfers itself.

In order to relieve the microprocessor from the chore of controlling the movement of blocks of memory inside the computer, a direct memory access (DMA) controller is normally used. The DMA controller receives information from the microprocessor as to the base location from where bytes are to be moved, the address to where these bytes should go, and the number of bytes to move. Once it has been programmed by the microprocessor, the DMA controller oversees the transfer of the memory data within the computer system. Normally, DMA operations are used to move data between input/output (I/O) devices and memory.

It is desirable to provide a system with another bus in addition to a PCI bus and an ISA bus. For example, this additional expansion bus can be a Microchannel (a trademark of IBM) bus. A Microchannel bus has improved performance characteristics with respect to the ISA bus, and certain devices have been designed to take advantage of the Microchannel architecture.

Providing a system already equipped with a PCI bus and an ISA bus with a Microchannel bus (or other expansion bus) provides the advantages of: (1) the extremely high performance of the PCI bus; (2) the very large selection of ISA compatible devices; and (3) backward compatibility with devices in which a system user has invested that are designed especially for a specific expansion bus. A problem exists, however, in the DMA control of devices in the system since a DMA control circuit in a PCI/ISA bridge is not compatible with Microchannel (or any other expansion bus) architecture. Simply adding another DMA control circuit to the system to provide DMA control of the devices coupled to the expansion bus presents a problem in that the first and second DMA control circuits in the system could decode the same I/O addresses, leading to system error.

SUMMARY OF THE INVENTION

There is a need for an arrangement which allows the addition of an expansion bus to a system that already has first and second buses, a bridge chip and a first DMA control circuit, without causing system error due to the presence of two DMA control circuits in the system.

This and other needs are met by the present invention which provides a computer system comprising a first bus and a second bus, devices coupled to the second bus, and a first bridge coupled between the first and second buses. The first bridge has a first direct memory access (DMA) control circuit for controlling DMA transfers with the devices coupled to the first, second, and third buses. The system further comprises a third bus, with devices coupled to the third bus. A second bridge is coupled between the first and third buses. This second bridge has: a second DMA control circuit that controls DMA transfers with the devices coupled to the first, second and third buses; and logic that disables the first DMA control circuit such that only the second DMA control circuit controls DMA transfers within the computer system.

In certain preferred embodiments of the present invention, the first bus is a peripheral controller interconnect (PCI) bus, the second bus is an industry standard architecture (ISA) bus, and the third bus is a Microchannel bus.

The present invention allows a system to be configured to take advantage of the speed of a PCI bus, and the wide range of devices available for use with the ISA bus, and still be able to use other devices that are designed for other expansion buses for which devices have been especially designed, such as the Microchannel bus. It does this by disabling the first DMA control circuit in the bridge between the ISA bus and the PCI bus, and allowing the second DMA control circuit (coupled to the expansion bus) to assume the responsibilities of the first DMA control circuit upon the expansion bus being added to the system.

The foregoing and other objects, features, aspects and advantages of the present invention will become more apparent from the following detailed description of the present invention when taken in conjunction with the accompanying drawings.

DESCRIPTION OF THE ILLUSTRATIVE EMBODIMENTS

Figure 1:
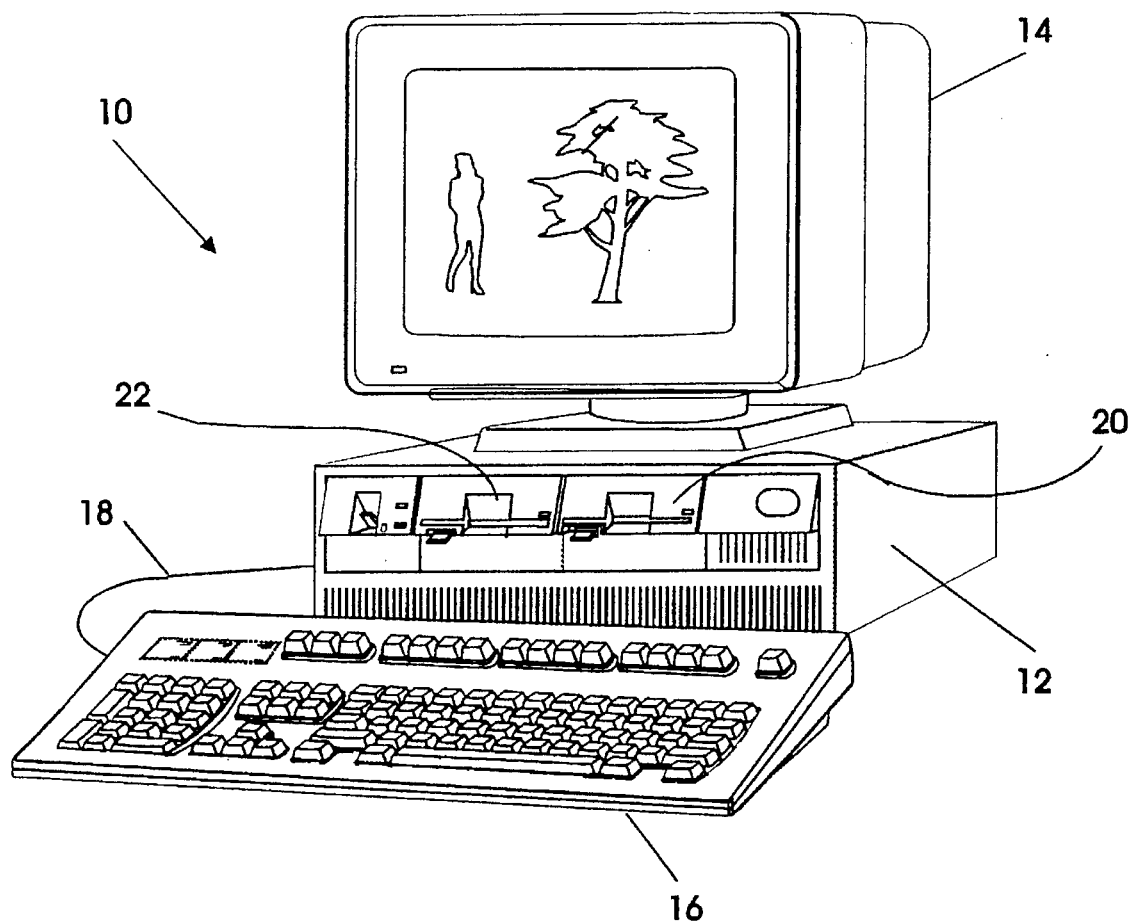
FIG. 1 is a perspective view of a computer system of the present invention.

With reference now to the Figures and in particular with reference to FIG. 1, a conventional computer, or PC, designated 10, is of the environment to which the invention has particular utility. Computer 10 which preferably, but not necessarily, is of a type utilizing an IBM personal computer or a similar system, includes a console housing 12 in which a circuit board containing the necessary circuitry including a microprocessor and BIOS chips, controllers, random access memory and other hardware are arranged. The computer will also include a video display 14 and a keyboard 16 connected to the housing 12 through cable 18. Mass storage media includes a hard disk drive within the housing and is non-accessible to the user, and user-accessible floppy disks, as well as, optionally, CD-ROM drives 20 and 22.

Figure 2:
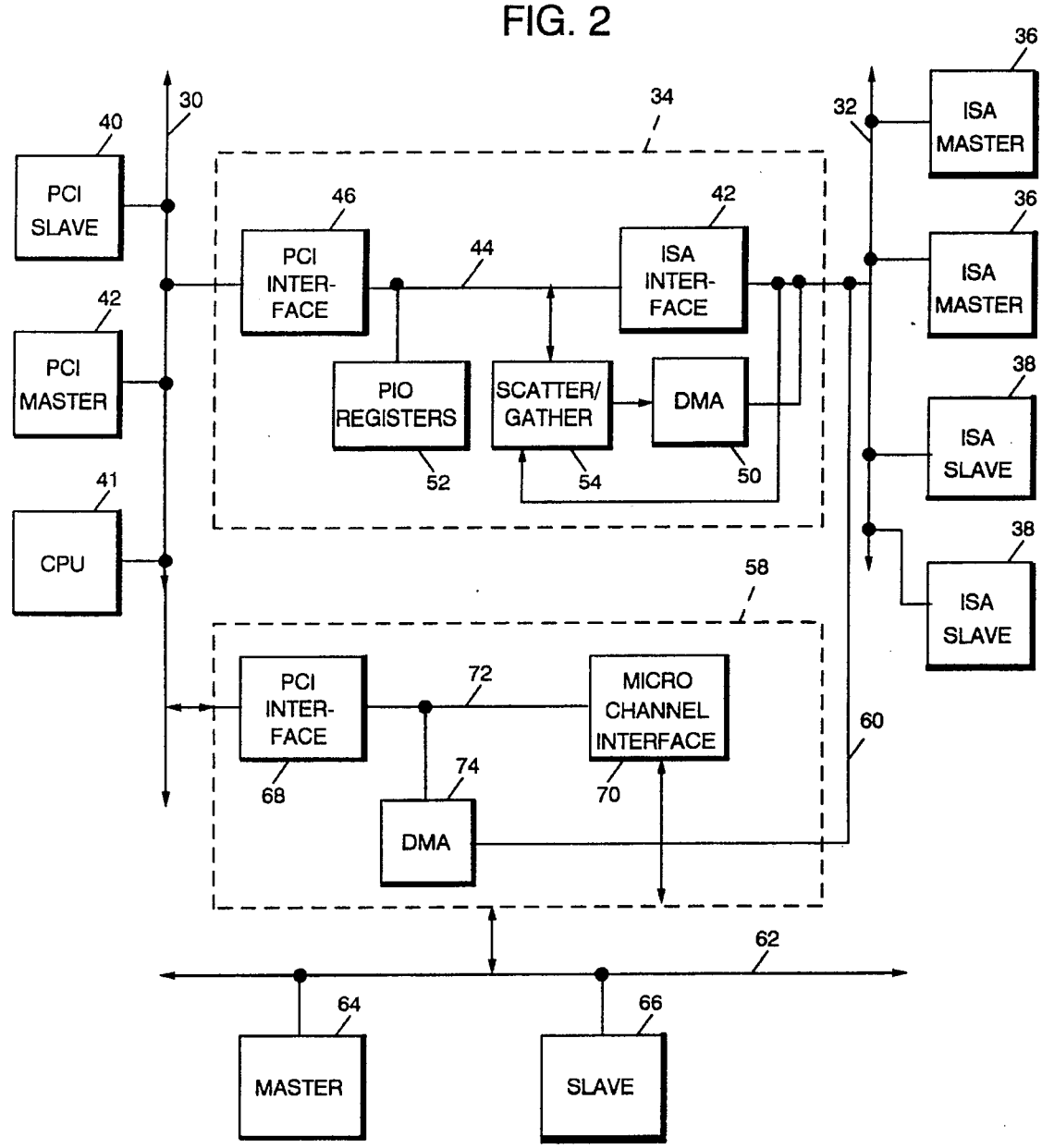
FIG. 2 is a block diagram of the computer system of FIG. 1 constructed in accordance with an embodiment of the present invention.

FIG. 2 is a block diagram of a computer system constructed in accordance with an embodiment of the present invention. The system includes a PCI bus 30, an ISA bus 32, with a plurality of ISA masters 36 and ISA slaves 38. A plurality of PCI memory slaves 40 are coupled to the PCI bus 30.

The bridge chip 34 contains an ISA interface 42 coupled between the ISA bus 32 and a system bus 44. A PCI interface 46 is provided between the PCI bus 30 and system bus 44. The bridge chip 34 also has a DMA control circuit 50, programmable I/O (PIO) registers 52, and a scatter/gather unit 54. The DMA control circuit 50 is coupled to the ISA bus 32. The bridge chip 34 provides an interface between the PCI bus 30 and the ISA bus 32.

The ISA bus interface 42 in the bridge chip 34 translates ISA bus cycles into system bus cycles for use by the bridge chip 34. The PCI bus interface 46 converts PCI bus cycles from the PCI bus 30 into system bus cycles for the bridge chip 34. The DMA control circuit 50 controls DMA control of memory accesses within the system. The DMA control circuit 50 provides a plurality of separate DMA channels over which memory accesses involving the individual ISA masters 36 are respectively communicated.

The DMA control circuit 50 is programmable over either the ISA bus 32 or by the scatter/gather unit 54. Allowing the DMA control circuit 50 to still be programmed over the ISA bus 32 permits compatible PIO operation to occur when the DMA controller is programmed, so that if compatibility software is running, it appears that the DMA control circuit 50 is residing on the ISA bus 32.

In addition to the PCI bus 30 and the ISA bus 32, the present invention also provides a third bus 62, such as a Microchannel (a trademark of IBM) bus, although other types of buses can be used instead of a Microchannel bus. This bus 62 serves as an expansion bus and allows the computer system to make use of devices that are not ISA compatible. For example, a Microchannel compatible master 64 and a slave 66 are coupled to the expansion bus 62 in the embodiment of FIG. 2. The use of a non-ISA bus as the expansion bus 62 expands the type of devices that can be coupled to the system.

The expansion bus 62 is coupled to the PCI bus 30 through a second bridge chip 58. Expansion bus cycles are converted to system bus cycles (and vice versa) by an interface 70. In the exemplary embodiment, the expansion bus 62 is a Microchannel bus, so the interface 70 is a Microchannel to system bus interface. A PCI interface 68 is coupled to the Microchannel interface 70 by a system bus 72. The PCI interface 68 converts between system bus cycles and PCI bus cycles.

The second bridge chip 58 includes an "alternate" DMA control circuit 74. The term "alternate" is used, since this DMA control circuit 74 takes over the function of the DMA control circuit 50 in the first bridge chip 34. In the exemplary embodiment, the alternate DMA control circuit 74 controls DMA transfers with Microchannel compatible devices. Since it is compatible with the Microchannel architecture, the DMA control circuit 74 also has the ability to control DMA transfers with ISA compatible devices. The alternate DMA control circuit 74 receives requests from devices on the ISA bus 32 and the Microchannel bus 62. Arbitration among the devices for performing a DMA transfer is performed within the alternative DMA control circuit 74, which grants priority to one of the devices on either the ISA bus 32 or Microchannel bus 62 to perform the DMA transfer.

Figure 4:
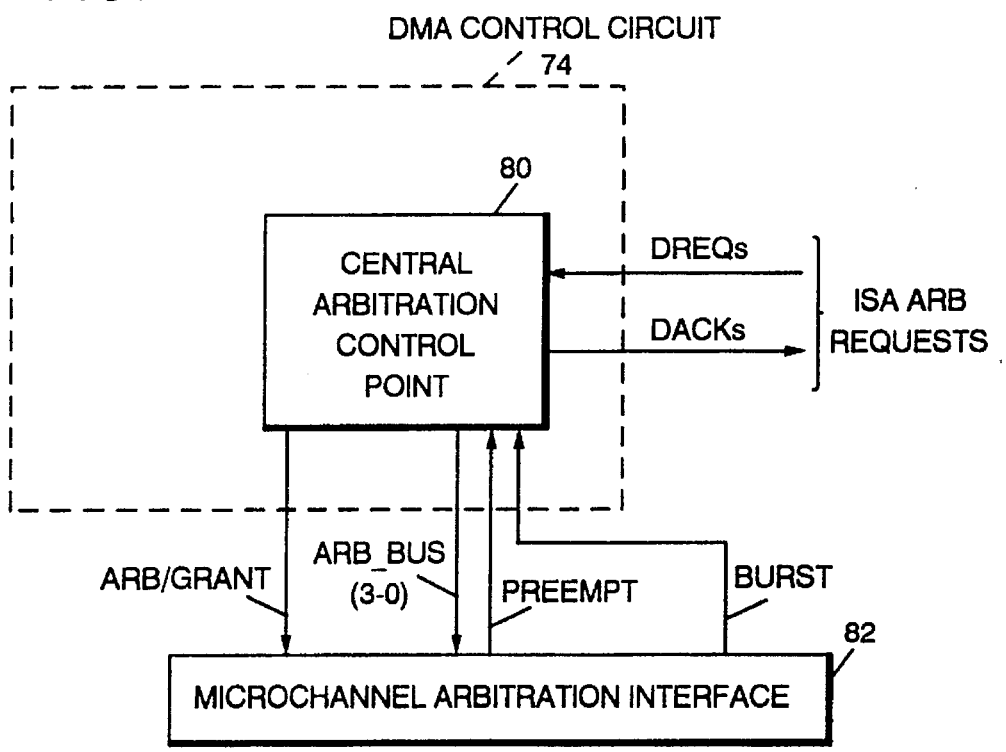
FIG. 4 is a block diagram of an exemplary embodiment of an alternate DMA control circuit in accordance with the present invention.

An exemplary embodiment of the alternate DMA control circuit is shown in FIG. 4. A central arbitration control point 80 receives the DREQ#s from the ISA devices and sends DACK#s to these devices. The control point 80 is also coupled to the Microchannel bus 62 through a Microchannel arbitration interface 82. The control point 80 receives preempt and burst signals, generates arb/grant signals, and utilizes an arbitration bus. Based upon the received signals, the control point 80 performs central arbitration for alll of the ISA and Microchannel devices making requests, and controls access to the system through the DACK# signals and the arb/grant signal.

The illustrated embodiment of the present invention has two DMA control circuits 50, 74. The first DMA control circuit 50 is part of the first bridge chip 34 that connects the ISA bus 32 with the PCI bus 30. The second, alternate DMA control circuit 74 is part of the second bridge chip 58 that is added to the system in order to add the expansion bus 62 and those devices 64, 66 specifically designed for use with this expansion bus 62. Although two DMA control circuits 50, 74 are provided when the second bridge chip 58 and the expansion bus 62 are added to the system, only one of these DMA control circuits 50, 74 can be allowed to remain operable since both circuits would decode the same I/O addresses, etc. This would cause great confusion within the system.

In order to resolve the problem caused by the presence of two DMA control circuits in the system when an expansion bus and bridge has been added to a system that already has a DMA control circuit, the present invention disables one of the DMA control circuits and performs the DMA control for the entire system with the remaining DMA control circuit.

The alternate DMA control circuit 74, since it is able to perform DMA transfers and arbitration for both the Microchannel architecture and the ISA compatible devices, remains enabled. The DMA control circuit 50, on the other hand, is disabled since it is not compatible with the Microchannel architecture. A block diagram that depicts in more detail the connections between DMA control circuits 50, 74 and an ISA DMA slave 38 is provided in FIG. 3.

Figure 3:
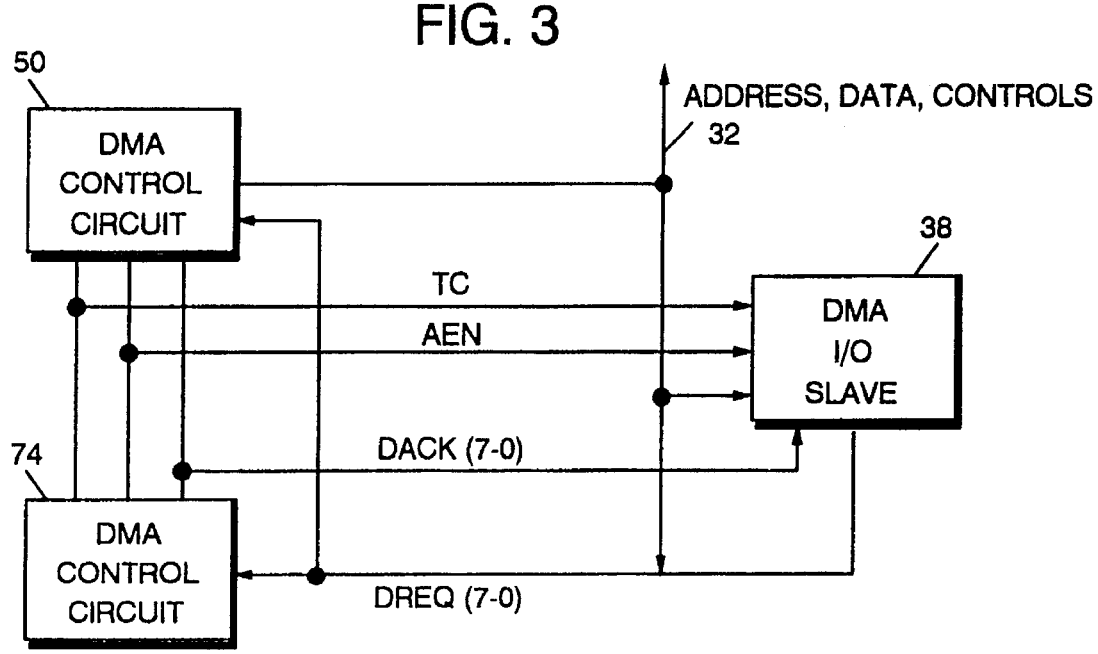
FIG. 3 is a block diagram illustrating an exemplary embodiment of the connections between the DMA control circuits and a DMA slave.

As seen in FIG. 3, the control signals from both the DMA control circuit 50 and the alternate DMA control circuit are dot connected to form a tristate bus to the ISA slave 38. These control signals include the acknowledge signal (DACK#), the address enable (AEN) and terminal count (TC), as provided by conventional DMA control circuits. However, due to the dot connections to form a tristate bus, only the control signals from one of the DMA control circuits 50 or 74 can be provided to the ISA slave 38 at any one time. The other set of control signals will necessarily be tristated.

As stated above, in order to disable the first DMA control circuit 50, the drivers of the circuit 50 are tristated. This prevents control signals from being asserted on the ISA bus 32 from the first DMA control circuit 50. Software can be used to disable the first DMA control circuit 50. The software to disable the first DMA control circuit 50 is readily programmable by one of ordinary skill in the art.

Upon system power-up, the DMA control circuit 50 is disabled and its outputs are tristated. The CPU 41 determines if the alternate DMA control circuit 74 is present in the system. If the alternate DMA control circuit 74 is not in the system, the CPU 41 enables the DMA control circuit 50 so that its control signals are not tristated. If the alternate DMA control circuit 74 is present in the system, then the CPU 41 maintains the DMA control circuit 50 in its disabled state, with tristated control signal outputs.

The alternate DMA control circuit 74, in addition to the arbitration and other functions it performs for devices on the expansion bus 62, functions as the DMA control circuit for those devices on the ISA bus 32. As already described and shown in FIG. 3, the alternate DMA control circuit 74 sends out the same control signals, such as the acknowledge signals (DACK#), address enable signals, and the terminal count signal, as if it was the first DMA control circuit 50. The devices 36, 38 on the ISA bus 32 are not aware of the difference in the DMA control circuits.

An exemplary DMA transfer involving the alternate DMA control circuit 74 proceeds as follows. Note that the DMA control circuit 50 is disabled and does not participate in the transfer. The ISA slave 38 requesting a DMA transfer asserts DREQ#, received by the alternate DMA control circuit 74, which performs arbitration among the devices on the ISA bus 32 and the Microchannel bus 62. Assuming that the ISA slave 38 is granted priority, the alternate DMA control circuit 74 issues an I/O read cycle across the PCI bus 30, destined for the ISA DMA slave 38. The bridge chip 34 forwards the I/O read cycle to the ISA bus 32, and the ISA DMA slave 38 will then place its data on the ISA bus 32. This data passes through the bridge chip 34, onto the PCI bus 30, through the PCI interface 58, onto the system bus 72 and into the alternate DMA control circuit 74. In the next cycle, the alternate DMA control circuit 74 sends the information back to the PCI bus 30 to the appropriate PCI memory slave 40. The information continues to be transferred in this manner until the terminal count is reached, at which time the alternative DMA control circuit 74 asserts the terminal count signal (TC) to the ISA DMA slave 38. The address enable signal (AEN) is driven throughout.

An exemplary embodiment of the present invention has been described with the expansion bus being a Microchannel bus. However, other types of expansion buses could be used without departing from the scope of the invention.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A computer system comprising:

a first bus and a second bus;

first devices coupled to the first bus;

second devices coupled to the second bus;

a first bridge coupled between the first and second buses, the first bridge having: a first direct memory access (DMA) control circuit for controlling DMA transfers with the devices coupled to the second bus, said first DMA control circuit being capable of being in an enabled state and a disabled state;

wherein said enabled state is characterized in that said first DMA control circuit controls DMA transfers with the devices coupled to the second bus and wherein said disabled state is characterized in that said first DMA control circuit does not control DMA transfers with the devices coupled to the second bus;

a third bus;

third devices coupled to the third bus; and a second bridge coupled between the first and third buses, the second bridge having: an alternate DMA control circuit that controls DMA transfers with the devices coupled to the first, second and third buses; and logic that disables the first DMA control circuit only when said first DMA control circuit is present in said system such that only the alternate DMA control circuit controls DMA transfers with devices coupled to the first, second and third buses within the computer system.

2. The computer system of claim 1, wherein the first bus is a peripheral controller interconnect (PCI) bus, the second bus is an industry standard architecture (ISA) bus, and the third bus is a Microchannel bus.

3. The computer system of claim 2, wherein the first DMA control circuit includes control signal drivers, and wherein the disabling of the first DMA control circuit includes tristating of the control signal drivers.

* * * * *